G. M. DUFFIE & W. A. PRESTON.
CENTRIFUGAL SEPARATOR.
APPLICATION FILED JULY 3, 1909. RENEWED JAN. 12, 1912.
1,038,731.
Patented Sept. 17, 1912.
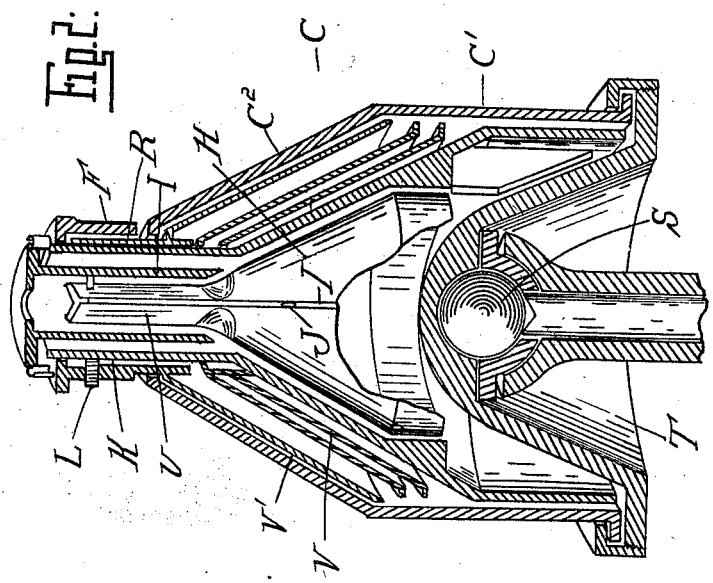
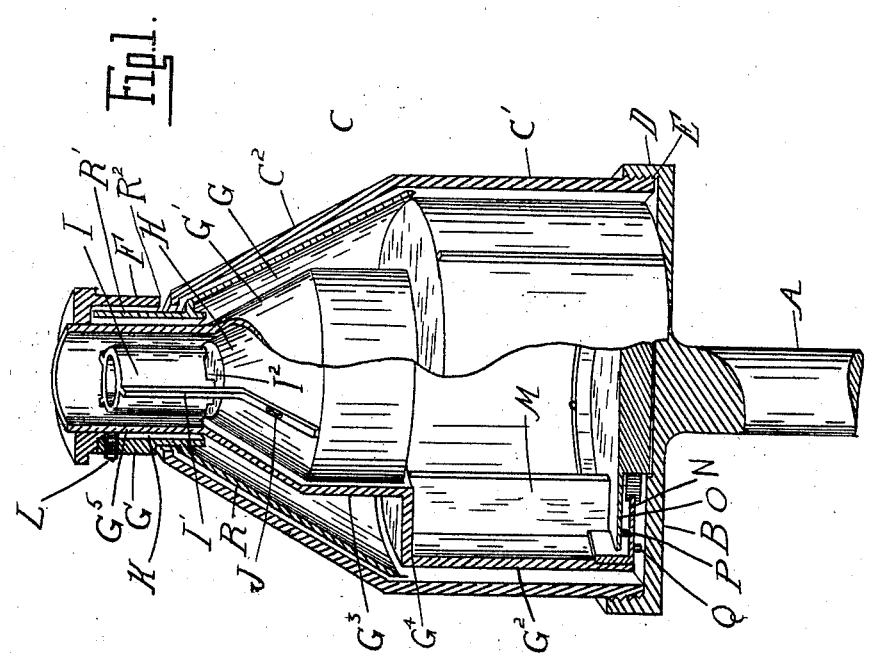
Witnesses
Inventors
George M. Duffie & William A. Preston

UNITED STATES PATENT OFFICE.

GEORGE M. DUFFIE AND WILLIAM A. PRESTON, OF DETROIT, MICHIGAN.

CENTRIFUGAL SEPARATOR.

1,038,731. Specification of Letters Patent. Patented Sept. 17, 1912.

Application filed July 3, 1909, Serial No. 505,875. Renewed January 12, 1912. Serial No. 670,951.

*To all whom it may concern:*

Be it known that we, GEORGE M. DUFFIE and WILLIAM A. PRESTON, citizens of the United States of America, residing at Detroit, in the county of Wayne and State of Michigan, have invented certain new and useful Improvements in Centrifugal Separators, of which the following is a specification, reference being had therein to the accompanying drawings.

The invention relates to centrifugal separators, and more particularly to the type employed for the separation of cream from full milk.

It is the object of the invention—first, to form a simple construction and one, the parts of which can be easily detached for cleansing; further, to facilitate the separation and close skimming of the cream while avoiding the use of complex skimming devices, which have a detrimental action on the cream; further, to provide means for introducing the full milk and initiating the separation with as little interference as possible with the cream and skimmed milk previously separated.

With these and other objects in view, the invention consists in the construction as hereinafter set forth.

In the drawings—Figure 1 is a vertical longitudinal section through one construction of our improved separator; and Fig. 2 is a similar view illustrating a slightly modified construction.

A is the revolving spindle driven by any suitable mechanism (not shown), and upon which the bowl is mounted. As illustrated in Fig. 1, B is the base of the bowl mounted upon the spindle A, and C is the body of the bowl secured to the base B preferably by means of the flange D and threaded collar E. This body portion of the bowl preferably consists of a cylindrical portion $C'$ and a tapering upper portion $C^2$, the latter terminating in a neck portion F. Within the body of the bowl is arranged a member G dividing the space into an inner and an outer separating chamber. The member G preferably has a tapering conical portion $G'$ within the conical portion $C^2$ of the bowl body, and a cylindrical portion $G^2$, which is of greater diameter and arranged within the portion $C'$ of the body. Between the portions $G'$ and $G^2$ is a portion $G^3$, which also is of cylindrical form but of lesser diameter than the portion $G^2$, connecting with the latter by a substantially horizontal annular portion $G^4$. There is also the neck portion $G^5$, which projects upward within the neck F of the bowl body. A third member H is arranged within the member G and is of substantially similar form and parallel to the tapering portion $G'$ and cylindrical portion $G^3$. It is, however, separated from the latter preferably by a longitudinally-extending rim so as to form therebetween a narrow space for a purpose that will be hereinafter described.

I is a member secured to the member H and extending upward therefrom within the neck $G^5$, being separated from the latter by longitudinal ribs $I'$. This member I is tubular, but at its lower end has one or more radially-opening apertures $I^2$ which establishes communication between the center of the tube and the thin space intermediate the members $G'$ and H.

With the construction as thus far described, the function of the various parts, in coöperation with each other, is as follows: The full milk is first introduced into the tube I, which imparts to it a certain degree of initial movement, after which it is discharged through radial apertures $I^2$ into the narrow space between the members $G'$ and H. In this space the milk is compelled to rotate at the speed of the contacting members, as the longitudinal ribs $I'$ divide the annular space into segments and prevent a differential rotation of the milk around the axis of the bowl. As the milk descends the flaring passage, its velocity is correspondingly increased until it reaches the space within the cylindrical portion $G^3$. This space is concentric with and parallel to the axis of the bowl, and consequently the direction of movement of the milk is changed, so that when it is finally discharged into the space within the enlarged cylindrical portion $G^2$ the direction of movement will be exactly parallel to the axis of the bowl. This accomplishes a twofold purpose—first, the separation of the milk is initiated while it is inclined between the closely spaced parallel walls so that there is very little interference between the outward and inward moving particles, and the partially separated milk is finally discharged in a thin sheet into the body portion of the bowl; second, the location of the portion $G^3$ is such that the milk thus introduced is in a zone intermediate the lighter and the heavier of the separated products, and consequently does not interfere with or again mix up the materials previously separated. A further and important function performed by the inner member H is that of a baffle between the incoming and downwardly-directed full milk and the outgoing upwardly-going cream. This baffle compels the separated cream to pass inward as it travels along the conical portion thereof $G'$, but at a certain point apertures J are provided being preferably located in the ribs $I'$, and which communicate with registering apertures in the member G so as to permit passage of the cream to the space outside of the latter and between the same and the outer wall C. From this space, the cream passes upward through the narrow space K between the tube $G^5$ and the neck portion $R'$ until finally the discharge aperture variably restricted by the screw L is reached and the cream is permitted to escape. The main separation takes place as the milk is introduced from the narrow cylindrical space into the body of the bowl within the cylindrical portion $G^2$. Within this space a plurality of radial wings M are preferably arranged to compel the milk to rotate at the speed of the bowl. Otherwise, the space is entirely free from obstructions, or any surface that might have a detrimental action upon the cream. There is also very little interference, for the reason already stated that the separation is initiated while the incoming milk is confined between the narrow spaces, and after it passes into the open bowl it is in a zone intermediate the lighter and heavier of the separated products, permitting each constituent part to travel, without interference, to its proper zone. The cream passes upward within the baffle H, but the skimmed milk, after passing downward in the lower end of the cylindrical portion $G^2$, is compelled to pass radially inward between a flange N secured to said cylindrical portion $G^2$ and a disk O arranged thereabove and centrally seated upon the bottom of the bowl. The disk O and flange N are held apart by suitable spacers P and similar spacers Q hold the flange spaced from the bottom of the bowl, so that after the skimmed milk has passed inward and around the flange N it may again pass outward to the extreme periphery of the bowl. Here it passes upward between the portion $C'$ of the bowl and the cylindrical portion $G^2$ and then to the conical part of the bowl, where the skimmed milk passes between a conical member R and the conical portion $C^2$. Finally, it passes upward through the space between the neck portion F and an upwardly-extending tube $R'$ on the member R, and is discharged through an aperture $R^2$. The cream still remaining with the skimmed milk during its passage around the flange N is finally separated by the intensified centrifugal action at the periphery of the cylindrical portion $C'$ of the bowl. Here it is forced inward against the cylindrical wall $G^2$ and is caused to travel upward into the conical space within the conical baffle $G^4$ and outside of the member G. Finally, it passes to a point where it is commingled with the cream passing through the aperture J and is discharged therewith. When the full milk is first introduced into the tube I, as already described, it will be commingled at the lower end of said tube with air drawn in between the tube I and surrounding tube K. Thus the commingled air and milk will pass downward into the separating portion of the bowl, and in this way separation will be facilitated as the air, in being squeezed out of the milk and forced inward, will carry the cream particles along with it.

The modification illustrated in Fig. 2 is the same in its general organization, but differs somewhat in detail from that shown in Fig. 1. Thus the bowl is shown as attached to the spindle by a self-balancing mechanism S (which forms no part of the present invention), and this necessitates a hollow bottom T projecting upward in the central portion of the body of the bowl. The full milk, when first introduced into the tube I, is set into motion by the wings upon a central shank U secured to the member H and projecting upward therefrom, and these wings continue between the conical member H and the parallel member K. The construction of Fig. 2 further differs from that in Fig. 1 in the arrangement of a number of skimming cones V, $V'$, etc., in the conical space between the member G and the conical portion $C^2$ of the bowl body. These skimming cones are all readily detachable for cleansing, and, inasmuch as the greater portion of the cream is already extracted before the milk reaches the chamber containing the skimming cones, their action will not be detrimental to the quality of the cream.

What we claim as our invention is:

1. In a centrifugal separator, the combination with a bowl, of an inlet tube for the incoming full fluid, and means associated with said inlet tube for introducing the full fluid into the body of the bowl in a thin sheet concentric with the axis of the bowl and traveling in a direction parallel to said axis.

2. In a centrifugal separator, the combination with a bowl, of an inlet tube for the incoming full fluid, and means associated with said inlet tube for introducing the full fluid into the body of the bowl in a thin sheet concentric with the axis of the bowl and traveling in a direction parallel thereto, said thin sheet being introduced in a zone intermediate the heavier and the lighter of the separated products.

3. In a centrifugal separator, the combination with a bowl, of means for introducing the full fluid into the body of the bowl in a thin annular sheet concentric with and traveling parallel to the axis of the bowl, and associated means for communicating the movement of the bowl to said thin sheet whereby separation is initiated and the separated products are permitted to travel in opposite directions when first introduced into the body of the bowl and without interference with each other.

4. In a centrifugal separator, the combination with a bowl, of means for introducing the full fluid into said bowl in a thin conical sheet and for changing the direction of travel of said sheet to one parallel to the axis of the bowl before discharging the same into the body of the bowl.

5. In a centrifugal separator, the combination with a bowl, of a downwardly-flaring conical member terminating in a cylindrical portion arranged within said bowl, an inner member of similar form arranged to form a narrow space between the same and said outer member, and spacing ribs for holding said members apart and for communicating rotary movement to the fluid therebetween.

6. In a centrifugal separator, the combination with a bowl, having a cylindrical portion and a conical upper portion, of a member arranged within said bowl having also a cylindrical portion and a conical upper portion with an intermediate cylindrical portion of lesser diameter than the lower cylindrical portion, a member within said last-mentioned member having a conical portion and a cylindrical portion parallel to but slightly spaced from the upper portions of said first-mentioned member within the bowl, and means for introducing the full fluid into the space between said members whereby separation will be initiated in a thin sheet and the latter will be discharged into the body of the bowl in a direction parallel to the axis and concentric therewith.

7. In a centrifugal separator, the combination with a bowl having a cylindrical portion and a conical upper portion, with an intermediate portion of cylindrical form of lesser diameter than the lower portion, a member within said intermediate cylindrical portion and upper conical portion parallel thereto but slightly spaced therefrom, means for introducing the full fluid between said members, and means for discharging the lighter of the separated products from the space within said inner member.

In testimony whereof we affix our signatures in presence of two witnesses.

GEORGE M. DUFFIE.
WILLIAM A. PRESTON.

Witnesses:
NELLIE KINSELLA,
HARRY W. GRAHAM.

---

Copies of this patent may be obtained for five cents each, by addressing the "Commissioner of Patents, Washington, D. C."